(12) United States Patent
Matsuoka et al.

(10) Patent No.: US 7,171,282 B2
(45) Date of Patent: Jan. 30, 2007

(54) SHELL PLATING DEVELOPING METHOD, SHELL PLATING MANUFACTURING METHOD, COMPUTER PROGRAM FOR TEACHING THE METHODS, AND IMAGE RECORDING MEDIUM FOR TEACHING THE METHODS

(75) Inventors: Kazuyoshi Matsuoka, Mitaka (JP); Tadashi Matsukawa, Tokyo (JP)

(73) Assignees: The Cooperative Association of Japan Shipbuilders, Tokyo (JP); National Maritime Research Institute, Tokyo (JP)

( * ) Notice: Subject to any disclaimer, the term of this patent is extended or adjusted under 35 U.S.C. 154(b) by 342 days.

(21) Appl. No.: 10/504,269

(22) PCT Filed: Mar. 18, 2003

(86) PCT No.: PCT/JP03/03260

§ 371 (c)(1),
(2), (4) Date: Aug. 11, 2004

(87) PCT Pub. No.: WO03/079238

PCT Pub. Date: Sep. 25, 2003

(65) Prior Publication Data

US 2005/0131569 A1 Jun. 16, 2005

(30) Foreign Application Priority Data

Mar. 19, 2002 (JP) .............................. 2002-076094

(51) Int. Cl.
*G06F 17/50* (2006.01)
*B21D 9/04* (2006.01)

(52) U.S. Cl. ...................... 700/117; 700/165; 700/182; 72/369; 114/264

(58) Field of Classification Search ................ 700/117, 700/165, 182; 72/67, 133, 226, 369; 114/67 A, 114/74 A, 59, 264, 355; 283/117; 52/783.1
See application file for complete search history.

(56) References Cited

U.S. PATENT DOCUMENTS

| | | | | | |
|---|---|---|---|---|---|
| 5,156,034 A | * | 10/1992 | Lorbach | ...................... | 72/10.6 |
| 5,682,782 A | * | 11/1997 | Rosene et al. | ................ | 72/179 |
| 6,112,568 A | * | 9/2000 | Lindstrom | ................... | 72/179 |

OTHER PUBLICATIONS

Azariadis, P. et al.. Design of plane developments of doubly curved surfaces, Computer-Aided Design, vol. 29, No. 10, pp. 675 to 685, Oct. 1997, Elsevier Science Ltd., GB.

* cited by examiner

*Primary Examiner*—Leo Picard
*Assistant Examiner*—Sheela S. Rao
(74) *Attorney, Agent, or Firm*—Birch, Stewart, Kolasch & Birch, LLP

(57) ABSTRACT

The present invention provides a shell plating developing method leading to reduction of the amount of machining and improvement of the efficiency in manufacturing the shell plating. In the shell plating developing method according to the invention, a shell plating lattice system is constituted, and the directions in which the curvature of a shell plating P at each lattice point of the shell plating lattice system is maximum and minimum are determined (s102). Also, lines extending in the directions in which the absolute value of the curvature is large and small are determined as a first connection line $L_1$ and a second connection line $L_2$ (s104). The first connection line $L_1$ is developed as a straight line on a flat plate P" while the length of the first connection line $L_1$ is maintained. And the second connection line $L_2$ is developed as a line perpendicular to the straight line on a flat plate P" in such a way that the integrated value of the amount of machining corresponding to the extension ratio or the shrinkage ratio of the second connection line $L_2$ is minimum.

15 Claims, 8 Drawing Sheets

SHELL PLATING DEVELOPING METHOD, SHELL PLATING MANUFACTURING METHOD, COMPUTER PROGRAM FOR TEACHING THE METHODS, AND IMAGE RECORDING MEDIUM FOR TEACHING THE METHODS

TECHNICAL FIELD

The present invention relates to a method for developing a shell plating of a predetermined shape to a flat plate, a method for manufacturing the shell plating of predetermined shape from the flat plate, a computer program for teaching the methods, and an image/sound recording medium for teaching the methods.

BACKGROUND ART

A metallic shell plating of a predetermined shape for the marine vessel is manufactured by developing the shell plating on a metallic flat plate and bending the flat plate in the predetermined shape. To accurately machine the flat plate into the shell plating of predetermined shape, it is required that the shell plating is appropriately developed on the flat plate.

Conventionally, the shell plating developing methods typically include a geodesic line developing method, a diagonal line developing method, an orthogonal forward method, and an orthogonal return method. With the geodesic line developing method, a plurality of planes (frame planes) x in which the shell plating is cut crosswise and a plurality of intersecting lines (frame lines) y between the frame planes x and the shell plating curved face are determined, as shown in FIG. 12. Also, a plane-of-sight z intersecting (typically orthogonal to) the frame planes x is determined, and an intersecting line (line-of-sight) v between the plane-of-sight z and the shell plating curved face is determined. Moreover, a line on the shell plating curved face connecting both ends of the line-of-sight v in the shortest distance is determined as a geodesic line w. And the geodesic line w is developed as a straight line with the actual length on the flat plate, and the shell plating is developed on the flat plate with reference to this straight line.

When the developed flat plate is machined into the shell plating in which the lateral bending is severer than the longitudinal bending, the lateral bending is firstly made under a condition in which the amount of extension or shrinkage within the face is relatively small, and the longitudinal bending is made by drawing. In this case, the plate is shrunk by increasing the plate thickness, but it is required to have a larger size before machining corresponding to the shrinkage ratio. At this time, in developing the shell plating on the flat plate, the curved shell plating is extended to increase the area, and an increased area by extension is shrunk in machining to form the longitudinal bending.

However, according to a knowledge of the inventor of this application, it is difficult to say that the machining of the shell plating from the flat plate developed by the geodesic line developing method is suitable for the shell plating especially in a bow and stern portion with large curvature. That is, it cannot be said that the shell plating is optimally developed to the flat plate, and the amount of machining the developing flat plate into the shell plating becomes unnecessarily large, so that the machining efficiency is not always excellent. This is because the conventional developing method greatly depends on the knowledge and experience.

Thus, an object of the invention is to provide a shell plating developing method, a shell plating manufacturing method, and a computer program associated with the methods that leads to reduction of the amount of machining and improvement of the efficiency in manufacturing the shell plating.

DISCLOSURE OF THE INVENTION

In order to solve the above-mentioned problems, the present invention provides a shell plating developing method, comprising the steps of determining a first connection line and a second connection line constituting a shell plating lattice system based on a curvature of the shell plating, and being orthogonal at each lattice point of the shell plating lattice system, and developing the first connection line and the second connection line as the lines constituting a flat plate lattice system and being orthogonal to each other at each lattice point of the flat plate lattice system on the flat plate.

According to the invention, the flat plate is bent along the second connection line developed on the flat plate so as to bend the first connection line developed on the flat plate as well, thereby forming an intermediate curved plate. Thereafter, the intermediate curved plate is shrunk or extended in the direction of the second connection line to manufacture the shell plating of predetermined shape. In manufacturing the shell plating, how the flat plate should be bent, or how the intermediate curved plate should be shrunk or extended is clarified by the first and second connection lines. Therefore, the shell plating of predetermined shape can be easily manufactured from the flat plate even by person other than the skilled worker.

Also, the invention provides the shell plating developing method, wherein out of the directions in which the curvature of the shell plating at each lattice point of the shell plating lattice system is maximum and minimum, the line extending in a direction where the absolute value of the curvature is large may be determined as the first connection line, and the line extending in a direction where the absolute value of the curvature is small may be determined as the second connection line.

Further, the invention provides the shell plating developing method, wherein the connection lines extending in the directions in which the curvature of the shell plating at each lattice point of the shell plating lattice system is maximum and minimum are determined, the line on the shell plating interconnecting the end points of the connection lines in the shortest distance is determined as a geodesic line, and out of the connection lines, the line in which there is a smaller dislocation from the geodesic line is determined as the first connection line, and the line in which there is a larger dislocation from the geodesic line is determined as the second connection line.

According to the invention, the second connection line is developed from the shell plating on the flat plate in such a way that the integrated value of the amount of machining corresponding to the shrinkage ratio or the extension ratio of the second connection line is minimum, thereby leading to reduction of the amount of machining corresponding to the shrinkage ratio or the extension ratio of the flat plate required in manufacturing the shell plating and improvement of the efficiency in machining the shell plating as compared with the conventional methods.

Also, the invention provides the shell plating developing method, wherein the first connection line is developed as a straight line on the flat plate while the length of the first connection line is maintained, and the second connection line is developed on a flat plate as a line constituting a flat plate lattice system along with said straight line and orthogonal to the straight line at each lattice point of the flat plate lattice system in such a way that the integrated value of the amount of machining corresponding to the expansion ratio or the shrinkage ratio of the second connection line is minimum.

Further, the invention provides the shell plating developing method, wherein when the first and second connection lines are developed from the shell plating to the flat plate, a shell plating fraction area of the shell plating containing the first and second connection lines is determined, a developable surface is determined in which the first connection line contained in the shell plating fraction area is developed as a straight line while the length of the first connection line is kept invariable, and the second connection line contained in the shell plating fraction area is developed in such a way that the integrated value of the amount of machining corresponding to the expansion ratio or the shrinkage ratio is minimum, and the shell plating fraction area is developed on a part of the developable surface, the part of the developable surface is developed on a flat plate fraction area, and the first or second connection lines corresponding to the adjacent flat plate fraction areas are connected.

Also, the invention provides the shell plating developing method, wherein a band-shaped area containing the first connection line and the second connection line between the adjacent first connection lines is determined as the shell plating fraction area, wherein out of the circular cone surfaces having a vertex on the extension line of a tangential vector to the first connection line at a shell plating lattice point contained in the shell plating development area, and having a rotation axis perpendicular to a curvature vector of the second connection line at the shell plating lattice point, and passing through an end point of a vector in which the curvature vector is divided by the square of the absolute value of the curvature, a circular cone surface in which the first connection line is developed as a fraction of the generating line while the length of the first connection line is maintained and the second connection line is developed as a fraction of the contour line in such a way that that the integrated value of the amount of machining corresponding to the extension ratio or the shrinkage ratio of the second connection line is minimum is determined as the developable surface, and wherein the shell plating fraction area is developed on a part of the developable surface, the part of the developable surface is developed on the flat plate fraction area of sector shape by a conical projection method, the first connection line developed on the developable surface is developed as a longitude line on the flat plate, the second connection line developed on the optimal circular cone surface is developed as a latitude line on the flat plate, and the second connection lines corresponding to the adjacent flat plate fraction areas are interconnected.

Further, the invention provides the shell plating developing method, wherein on the basis of a second connection line in which the central angle of curvature is maximum or minimum when the second connection line is developed as a fraction of the contour line on the circular cone surface out of the second connection lines contained in the shell plating development area, a circular cone surface is determined as the developable surface in such a way that the integrated value of the amount of machining corresponding to the extension ratio or the shrinkage ratio of the second connec- tion line is minimum when another second connection line is extended or shrunk to coincide with the central angle of curvature.

Also, the invention provides the shell plating developing method, wherein the second connection lines are interconnected in such a way that a dislocation between the second connection lines contained in the adjacent flat plate fraction areas is minimized by the least square method.

Further, the invention provides the shell plating developing method, wherein when a local saddle point or umbilicus where the first and second connection lines can not be determined exists on the shell plating, the first and second connection lines extending from another point of the shell plating and passing through the saddle point or umbilicus are determined as the first and second connection lines relevant to the saddle point or umbilicus.

In order to solve the above-mentioned problems, the invention provides a shell plating manufacturing method, wherein after performing a shell plating developing method comprising the steps of constituting a shell plating lattice system, and out of the directions in which the curvature of a shell plating at each lattice point of the shell plating system is maximum and minimum, determining a first connection line extending in a direction in which the absolute value of the curvature is large and determining a second connection line extending in a direction in which the absolute value of the curvature is small, and developing the first connection line as a straight line on a flat plate while maintaining the length of the first connection line, and developing the second connection line as a line constituting a flat plate lattice system along with the straight line and being perpendicular to the straight line at each lattice point of the flat plate lattice system on a flat plate in such a way that the integrated value of the amount of machining corresponding to the extension ratio or the shrinkage ratio of the second connection line is minimum, the shell plating manufacturing method comprises the steps of bending the flat plate along the second connection line so that the curvature of the first connection line is coincident with the curvature based on in determining the first connection line on the shell plating, thereby forming an intermediate curved plate, and shrinking or extending the intermediate curved plate in the direction of the second connection line so that the length of the second connection line for the intermediate curved plate is coincident with the length of the second connection line for the shell plating in accordance with the extension ratio or the shrinkage ratio of the second connection line based on in developing the from the shell plating to the flat plate.

In order to solve the above-mentioned problems, the invention provides a computer program for teaching a shell plating developing method installed in one computer or uploaded via a network, wherein the computer program enables said one computer to perform an information providing function for the shell plating developing method or a function of uploading data regarding the shell plating developing method via a network to another computer to enable said another computer to perform the information providing function, the shell plating developing method comprising the procedures in which a shell plating lattice system is constituted, and out of the directions in which the curvature of a shell plating at each lattice point of the shell plating system is maximum and minimum, a first connection line extending in a direction in which the absolute value of the curvature is large and a second connection line extending in a direction in which the absolute value of the curvature is small are determined, and in which the first connection line is developed as a straight line on a flat plate while the length of the first connection line is maintained, and the second connection line is developed as a line constituting a flat plate lattice system along with the straight line and perpendicular to the straight line at each lattice point of the flat plate lattice system on a flat plate in such away that the integrated value of the amount of machining corresponding to the extension ratio or the shrinkage ratio of the second connection line is minimum.

According to the invention, the user can grasp the procedure for the shell plating developing method through one computer in which the program is installed or downloaded or another computer to which data is uploaded.

In order to solve the above-mentioned problems, the invention provides a computer program for teaching a shell plating manufacturing method, wherein the computer program enables one computer to perform an information providing function, which provides the information as to the flat plate containing the first and second connection lines obtained by performing the shell plating developing method, the curvature based on in determining the first connection line on the shell plating, the extension ratio based on in developing the second connection line from the shell plating to the flat plate or the shrinkage ratio in manufacturing the shell plating based on the extension ratio, or the shrinkage ratio or the extension ratio in manufacturing the shell plating based on the shrinkage ratio, or a function of uploading relevant data via a network to another computer to enable said another computer to perform the information providing function, which provides the information as to the flat plate containing the first and second connection lines obtained by performing the shell plating developing method, the curvature based on in determining the first connection line on the shell plating, the extension ratio based on in developing the second connection line from the shell plating to the flat plate or the shrinkage ratio in manufacturing the shell plating based on the extension ratio, or the shrinkage ratio or the extension ratio in manufacturing the shell plating based on the shrinkage ratio, wherein the shell plating developing method comprises the procedures in which a shell plating lattice system is constituted, and out of the directions in which the curvature of a shell plating at each lattice point of the shell plating lattice system is maximum and minimum, a first connection line extending in a direction in which the absolute value of the curvature is large and a second connection line extending in a direction in which the absolute value of the curvature is small are determined, and in which the first connection line is developed as a straight line on a flat plate while the length of the first connection line is maintained, and the second connection line is developed as a line constituting a flat plate lattice system along with the straight line and perpendicular to the straight line at each lattice point of the flat plate lattice system on a flat plate in such a way that the integrated value of the amount of machining corresponding to the extension ratio or the shrinkage ratio of the second connection line is minimum.

Also, the invention provides the computer program for teaching the shell plating manufacturing method, wherein the computer program enables one computer to perform an information providing function for the shell plating manufacturing method or a function of uploading the data relevant to the shell plating manufacturing method via a network to another computer to enable said another computer to perform the information providing function, the shell plating manufacturing method comprising the procedures in which the flat plate is bent along the second connection line so that the curvature of the first connection line may be coincident with the curvature based on in determining the first connection line on the shell plating to form an intermediate curved plate, and the intermediate curved plate is shrunk or extended in the direction of the second connection line so that the length of the second connection line on the intermediate curved plate may be coincident with the length of the second connection line on the shell plating in accordance with the extension ratio or the shrinkage ratio based on in developing the second connection line from the shell plating to the flat plate.

According to the invention, the user grasps the information of the shell plating manufacturing method through one computer in which the program is installed or downloaded or another computer to which data is uploaded. More specifically, the user can grasp to what extent the flat plate is bent along the second connection line, or the intermediate curved plate is shrunk or extended in the direction of the second connection line. Thereby, it is expected that the high quality shell plating is manufactured without needing the skills in an improved manner.

In order to solve the above-mentioned problems, the invention provides an image/sound recording medium for recording the image or the image and sound related with a shell plating developing method comprising the procedures in which a shell plating lattice system is constituted, and out of the directions in which the curvature of a shell plating at each lattice point of the shell plating lattice system is maximum and minimum, a first connection line extending in a direction in which the absolute value of the curvature is large and a second connection line extending in a direction in which the absolute value of the curvature is small are determined, and in which the first connection line is developed as a straight line on a flat plate while the length of the first connection line is maintained, and the second connection line is developed as a line constituting a flat plate lattice system along with the straight line and perpendicular to the straight line at each lattice point of the flat plate lattice system on a flat plate in such a way that the integrated value of the amount of machining corresponding to the extension ratio or the shrinkage ratio of the second connection line is minimum.

According to the invention, the user can grasp the procedure of the shell plating developing method through the visual sense or visual and auditory senses, using the image/sound reproducing apparatus.

Also, the invention provides the image/sound recording method, further comprising recording the image or the image and sound regarding the flat plate containing the first and second connection lines obtained by performing the shell plating developing method, the curvature based on in determining the first connection line on the shell plating, the extension ratio based on in developing the second connection line from the shell plating to the flat plate or the shrinkage ratio in manufacturing the shell plating based on the extension ratio, or the shrinkage ratio or the extension ratio in manufacturing the shell plating based on the shrinkage ratio.

Moreover, the invention provides the image/sound recording method, further comprising recording the image or the image and sound regarding the shell plating manufacturing method comprising the procedures in which the flat plate is bent along the second connection line so that the curvature of the first connection line may be coincident with the curvature based on in determining the first connection line on the shell plating to form an intermediate curved plate, and the intermediate curved plate is shrunk or extended along the direction of the second connection line so that the length of the second connection line on the intermediate curved plate may be coincident with the length of the second connection line on the shell plating in accordance with the extension ratio or the shrinkage ratio based on in developing the second connection line from the shell plating to the flat plate.

According to the invention, the user can grasp the procedure of the shell plating manufacturing method through the visual sense or visual and auditory senses using the image/sound reproducing apparatus. More specifically, the user visually grasps to what extent the flat plate is bent along the second connection line, the intermediate curved plate is shrunk or extended in the direction of the second connection line.

BEST MODE FOR CARRYING OUT THE INVENTION

The embodiments of a shell plating developing method, a shell plating manufacturing method, a computer program for teaching the methods, and an image/voice recording medium according to the invention will be described below with reference to the accompanying drawings.

Figure 1:
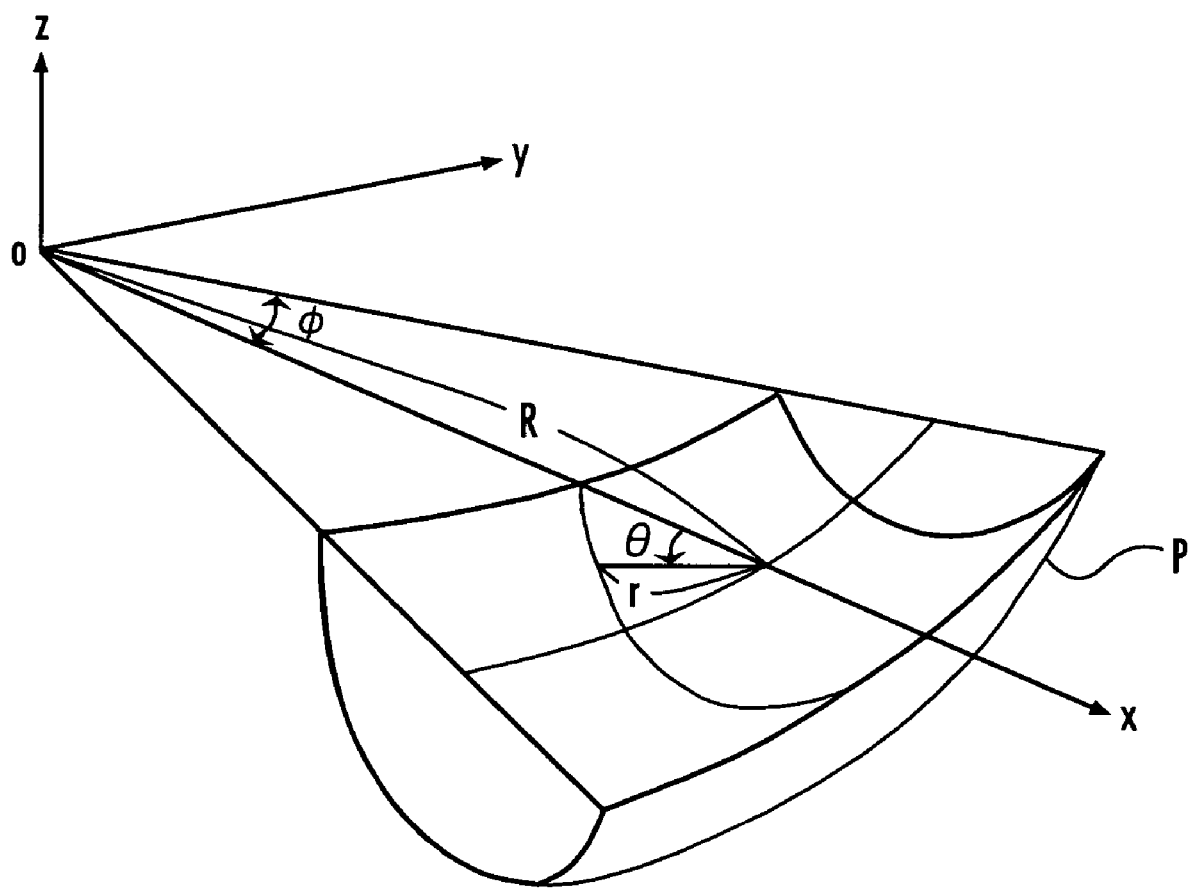
FIG. 1 is an explanatory view showing the shape of a shell plating to which a shell plating developing method and a shell plating manufacturing method according to the present invention are applicable.

An applicational object of the shell plating developing method is represented by the following expression (1), and a shell plating P constituting a fraction of a tours obtained by rotating a circle of radius r centered at (R, 0) on the x-y flat plate around the z axis, as shown in FIG. 1.

$$(x-R\cos\phi)^2+(y-R\sin\phi)^2+z^2=r^2-0.4[\text{rad}]\leq\phi\leq0.4[\text{rad}]z\leq0 \qquad (1)$$

Referring to FIGS. 2 to 10, a procedure of the shell plating developing method will be described.

Firstly, the directions (arrows ① and ② in FIG. 3) in which the curvature of the shell plating P (=(radius of curvature)$^{-1}$) is maximum and minimum, including plus and minus, at a point (X, Y) on the shell plating P are determined (s102 in FIG. 2(a)). Among the directions, selected is the direction in which the absolute value of curvature is large (arrow ① in FIG. 3), that is, a first connection line extending in the circumferential direction of the circle of radius r rotated around the z axis and connecting each point of the shell plating P in forming the tours is determined (s104 in FIG. 2(a), see $L_1$ in FIG. 4). Moreover, among the directions, the direction in which the absolute value of curvature is small (arrow ② in FIG. 3), that is, a second connection line extending in the direction that the circle of radius r is rotated around the z axis and connecting each point of the shell plating P in forming the tours is determined (s104 in FIG. 2(a), see $L_2$ in FIG. 4). A calculation method of the curvature at one point on the curved surface is well known and not described here.

Of two connection lines extending in the respective directions, the connection line having a small dislocation from the geodesic line maybe determined as the first connection line $L_1$, and the connection line having a large dislocation from the geodesic line may be determined as the second connection line $L_2$.

Figure 4:
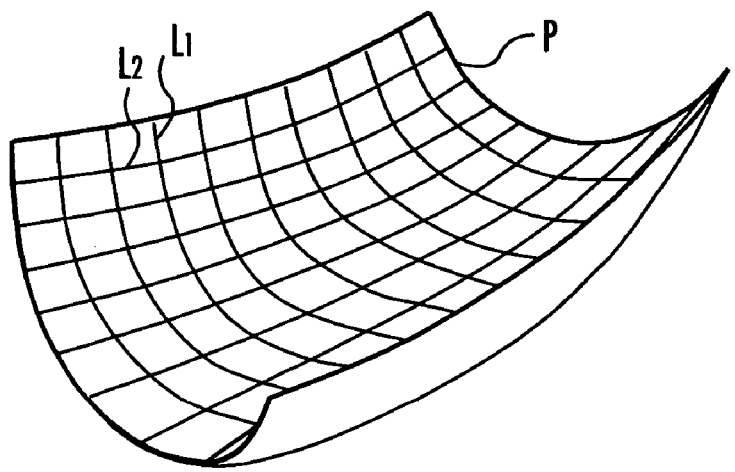

The first connection line $L_1$ and the second connection line $L_2$ constitute a shell plating lattice system orthogonal at each lattice point, as shown in FIG. 4. The interval between the first connection lines $L_1$ and the interval between the second connection lines $L_2$ may be larger or smaller based on the scale of the shell plating P than those as shown in FIG. 4.

Figure 5:
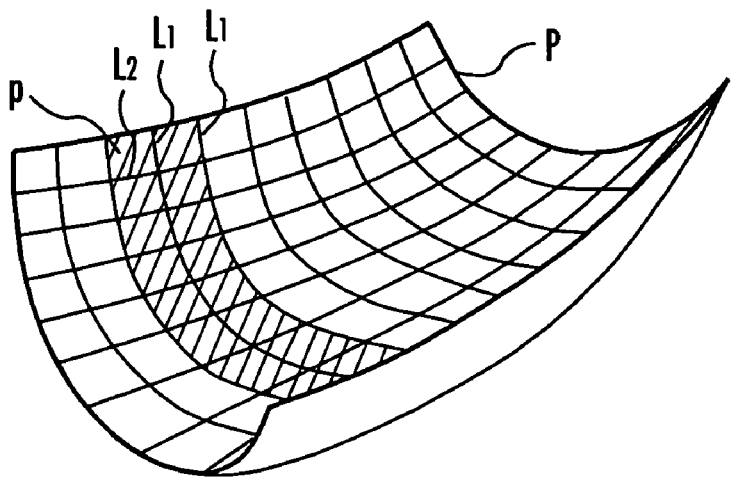

Next, a band-shaped area (shell plating fraction area) p dividing the shell plating P in the form of containing one first connection line $L_1$ and a fraction of the second connection line $L_2$ between adjacent first connection lines $L_1$ is determined as indicated by the slant line in FIG. 5 (s106 in FIG. 2(a)). The band-shaped area p is a curved plate gradually narrower from one end to the other end along the first connection line $L_1$.

Figure 6:
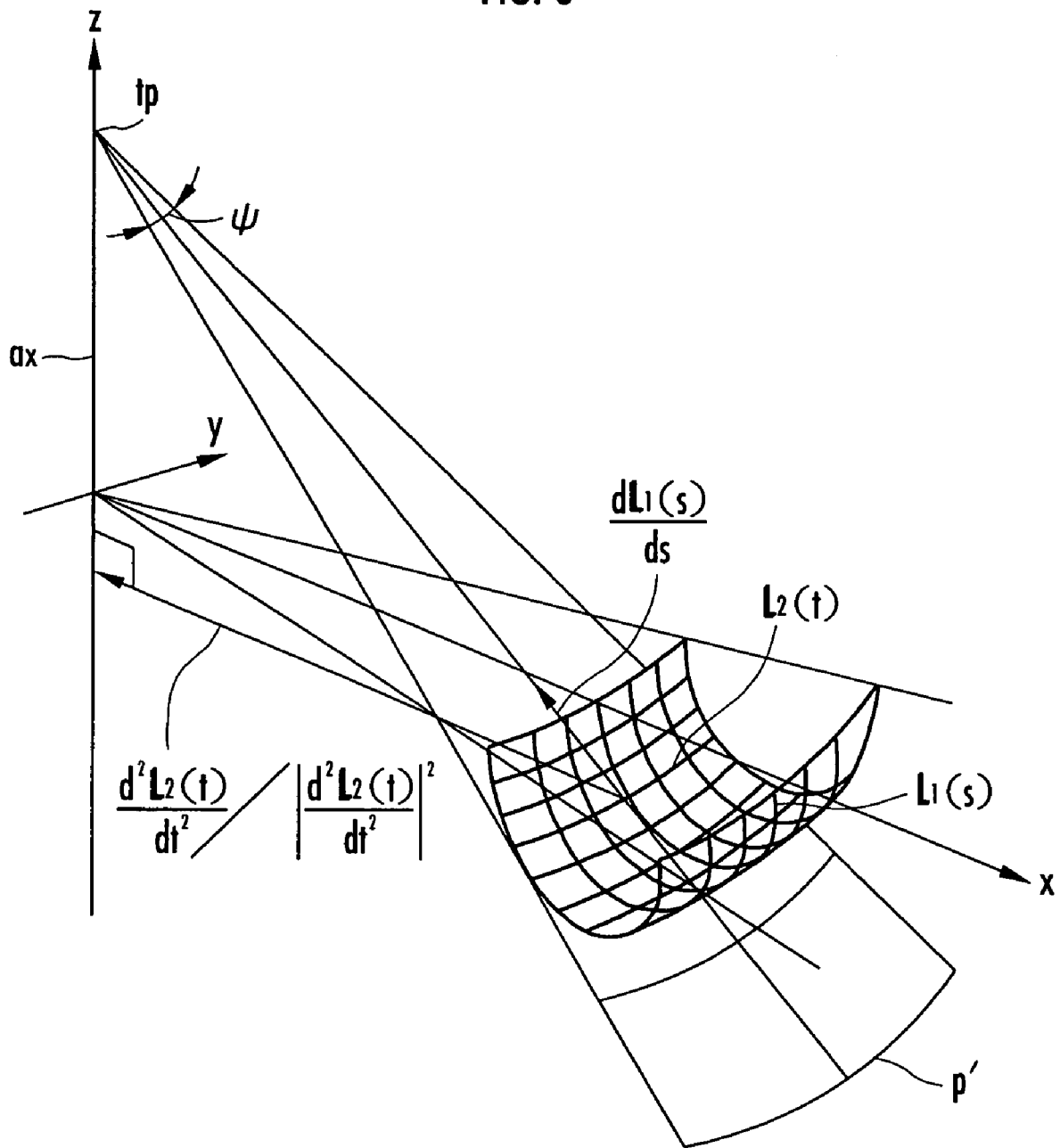

Subsequently, a circular cone surface P' is temporarily determined as shown in FIG. 6 (s108 in FIG. 2(a)). The circular cone surface P' has a vertex tp on the extension line of a tangential vector (=$dL_1(s)/ds$: $L_1(s)$ is a vector representing the first connection line $L_1$ at line element s) on the first connection line $L_1$ at a shell plating lattice point in the band-shaped area p. Also, the circular cone surface P' has a rotation axis ax perpendicular to a curvature vector (=$d^2L_2(t)/dt^2$: $L_2(t)$ is a vector representing the second connection line $L_2$ at line element t) on the second connection line at the lattice point and passing through an end point of a vector (=$\{d^2L_2/dt^2\}/|d^2L_2/dt^2|^2$) in which the curvature vector is divided by the square of the length of the curvature vector.

Next, the band-shaped area p is developed as a part p' of the circular cone surface P' temporarily determined (s110 in FIG. 2(a), see FIG. 6). Specifically, the first connection line $L_1$ in the band-shaped area p is developed as a fraction of the generating line on the circular cone surface P' while the length of the first connection line $L_1$ is maintained (see $L_1'$ in FIG. 6). Also, on the basis of the second connection line $L_2$ in which the central angle of curvature ψ is maximum, the second connection line $L_2$ is extended appropriately to be coincident with the maximum central angle of curvature $\psi_{max}$ when the second connection line is developed as a fraction of the contour line on the circular cone surface P', thereby the second connection line is developed as a fraction of the contour line on the circular cone surface P' (see $L_2'$ in FIG. 6).

Herein, the extension ratio ex(s) (=ψmax/ψ(s)−1) of each second connection line $L_2$ in the band-shaped area when the second connection line is developed as a fraction of the contour line (see $L_2'$ in FIG. 6) on the circular cone surface P' and the integrated value (accumulated value) Is(=∫ds·ex(s)) of the first connection line $L_1$ over the entire length are determined (s112 in FIG. 2(a)).

Figure 7:
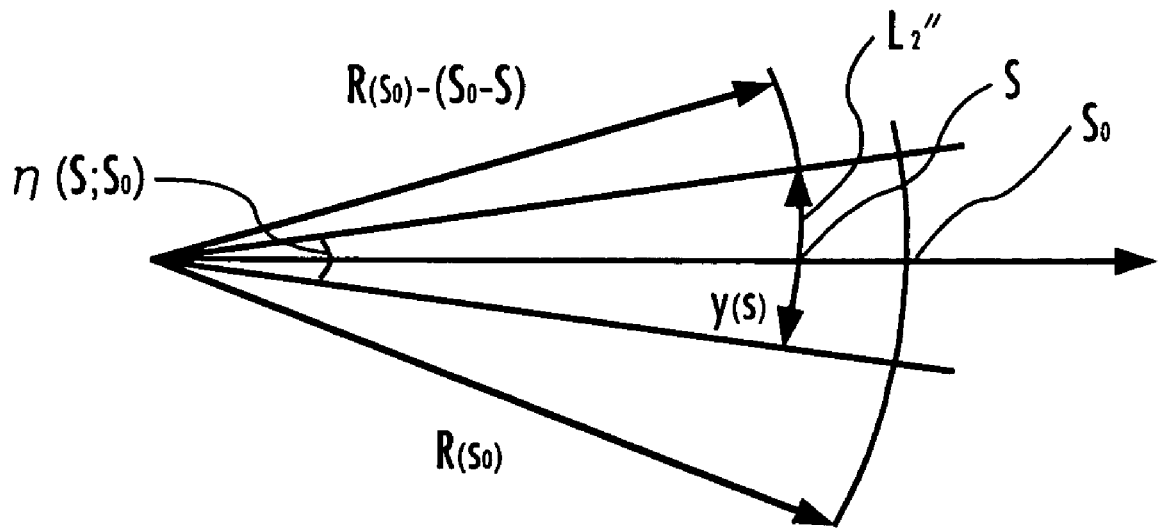

The extension ratio ex(s) may be determined in such a way that the second connection line $L_2$ is developed as a fraction of the contour line on the circular cone surface P' while the length of the second connection line $L_2$ is maintained (see $L_2'$ in FIG. 6), and as a fraction of the latitude line $L_2''$ on the flat plate P''' by the conical projection method (see $L_2''$ in FIG. 7).

If the circular cone surface P' is tangential to the first connection line $L_1$ at point $s_0$, the extension ratio ex(s) of the second connection line $L_2$ at point s is determined in accordance with the following expression (2).

$$ex(s)=1-\eta(s;s_0)/\eta_{max} \quad (2)$$

Herein, $\eta(s;s_0)$ is the central angle of curvature for a fraction of the arc-shaped second connection line $L_2$" developed on the flat plate P''', and $\eta_{max}$ is its maximum value. Also, $\eta(s;s_0)$ is determined from the length y(s) of the second connection line $L_2$" developed on the flat plate P''' and the radius of curvature $R(s_0)-s_0+s$ in accordance with the following expression (3) (see FIG. 7).

$$\eta(s;s_0)=y(s)/\{R(s_0)-(s_0-s)\} \quad (3)$$

And determining the circular cone surface P' at each shell plating lattice point (s108), developing the band-shaped area p as a part p' of the circular cone surface P' (s110), and determining the integrated value Is (s112) are repeated. In addition, the circular cone surface P' with the minimum integrated value Is is formally determined as the optimal "developable surface" (s114 in FIG. 2(a)).

Figure 8:
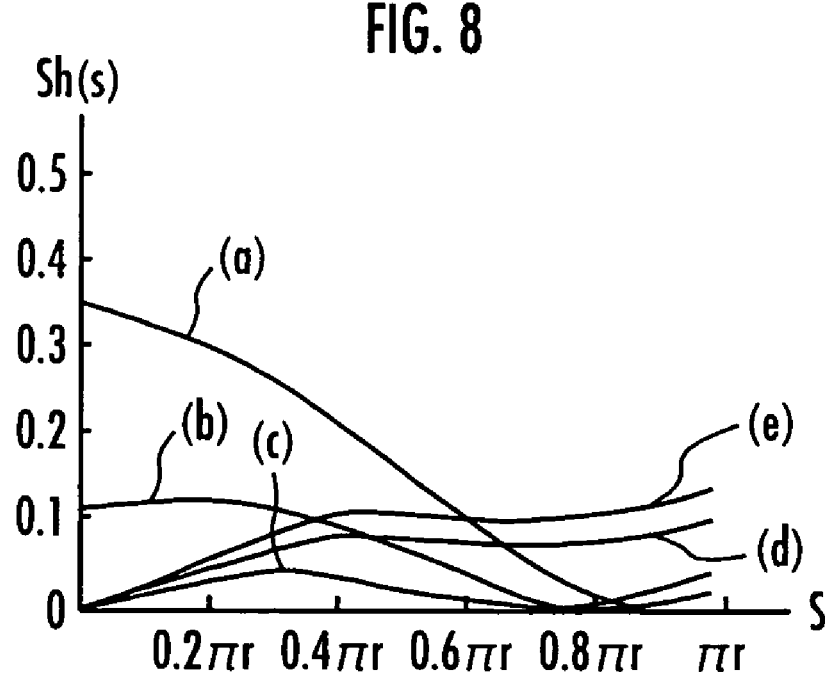

Herein, it is assumed that the band-shaped area p is developed as a fraction p' of the circular cone surface P' tangential to the first connection line $L_1$ at the position where the distance $s_0$ from one end of the first connection line $L_1$ is equal to (a) 0, (b) 0.11$\pi$r, (c) 0.22$\pi$r, (d) 0.33$\pi$r and (e) 0.44$\pi$r. Referring to FIG. 8, how the extension ratio ex(s) of the second connection line $L_2$ is changed along the entire length of the first connection line $L_1$ will be described.

The area surrounded by the curve ex(s) and the s axis in FIG. 8 corresponds to the integrated value Is (see s112 in FIG. 2(a)) over the entire length of the first connection line $L_1$. The integrated value Is indicates how much the shell plating P is extended along the second connection line $L_2$ when the shell plating P is developed on the flat plate P'''. That is, the integrated value Is indicates how much the flat plate P''' is shrunk along the second connection line $L_2$ when the shell plating P is manufactured. Accordingly, as the integrated value Is becomes smaller, the developing method becomes more suitable from the viewpoint of improvement of the efficiency in manufacturing the shell plating.

Referring to FIG. 8, in the case of (a), for example, ex(s) is particularly large in a range from s=0 to 0.4$\pi$r as compared with the case of (b) to (e), and it is required that the flat plate P''' is shrunk along the second connection line $L_2$". Then, ex(s) is optimal in the case of (c), namely, when the band-shaped area p is developed on a fraction p' of the circular cone surface P' tangential to the first connection line $L_1$ at the position s0=0.22$\pi$r.

Subsequently, the band-shaped area p is developed as a part p' of the circular cone surface P' formally determined (s116 in FIG. 2(a)). Specifically, the band-shaped area p is developed as a fraction of the generating line on the optimal circular cone surface P' while the length of the first connection line $L_1$ is maintained (see $L_1$ in FIG. 6). Also, on the basis of the second connection line $L_2$ in which the central angle of curvature $\psi$ is maximum when the second connection line is developed as a fraction of the contour line on the optimal circular cone surface P', a fraction of another second connection line $L_2$ is extended appropriately to be coincident with the maximum central angle of curvature $\psi_{max}$, whereby the second connection line is developed as a fraction of the contour line on the optimal circular cone surface P' (see $L_2$ in FIG. 6).

Figure 9:
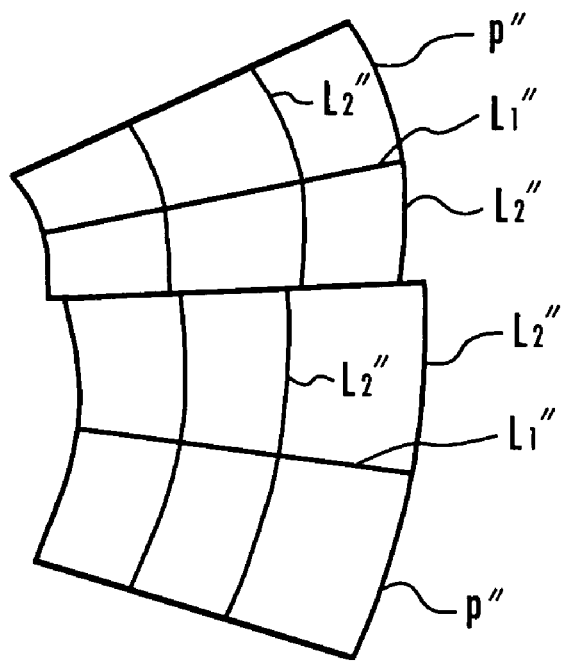

Next, the band-shaped area p developed as a part p' of the circular cone surface P' is developed as a sector area (fraction area of flat plate) p'' on the flat plate P''' by the conical projection method (s118 in FIG. 2(a), see FIG. 9). Specifically, the first connection line $L_1$' on the optimal circular cone surface P' is developed as a longitude line on the sector area p'' (see $L_1$'' in FIG. 9). Also, the second connection line $L_2$' on the circular cone surface P' is developed as a fraction of the latitude line on the sector area p'' (see $L_2$'' in FIG. 9).

In this way, the second connection lines $L_2$'' contained in the adjacent sector areas p'' are interconnected (s120 in FIG. 2(a)). At this time, if there is a dislocation in the second connection lines $L_2$'' contained in the adjacent sector areas p'' as shown in FIG. 9, the second connection lines $L_2$'' are interconnected by the least square method so that the total amount of dislocation is minimized.

Figure 10:
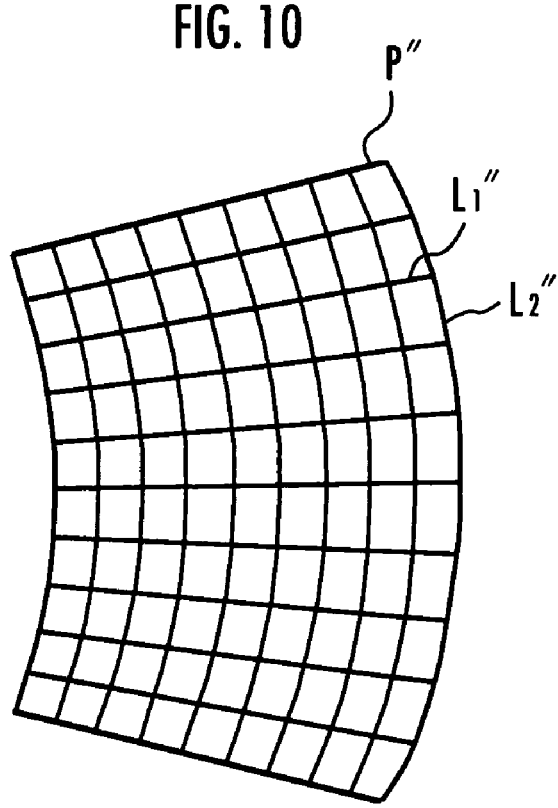
FIG. 10 is an explanatory view of a flat plate on which a shell plating is developed.

In this way, the shell plating P is developed on the flat plate P''' of substantial sector shape as shown in FIG. 10. Specifically, the first connection lines $L_1$ and the second connection line $L_2$ on the shell plating P are developed as the first connection lines $L_1$'' and the second connection line $L_2$' constituting the flat plate lattice system and orthogonal to each other at each lattice point on the flat plate P'''.

Next, referring to FIG. 2(b), a procedure for the method for manufacturing the shell plating P as shown in FIG. 1 by machining the flat plate P''' as shown in FIG. 10 will be described.

Firstly, the curvature along the first connection line $L_1$'' is determined (s202 in FIG. 2(a)). This curvature can be easily determined from the curvature based on in determining the directions in which the curvature on the shell plating P is maximum and minimum (s102 in FIG. 2(a)) and determining the first connection lines $L_1$ and the second connection line $L_2$(s104 in FIG. 2(a)).

Then, the shrinkage ratio sh(s) $(=1-(1+ex(s))^{-1})$ of the second connection line $L_2$'' is determined (s204 in FIG. 2A). The shrinkage ratio sh(s) is easily determined from the extension ratio ex(s) of the second connection line $L_2$ when the shell plating P is developed on the circular cone surface P', which is used as a basis in determining the optimal circular cone surface (s114 in FIG. 2(a)). That is, if the second connection line $L_2$ is extended by 0.10 of the total length when the shell plating P is developed on the circular cone surface P', the second connection line $L_2$'' is shrunk by 0.099 of the total length when the shell plating P is manufactured from the flat plate P'''.

Subsequently, the flat plate P''' is bent along the second connection line $L_2$ so that the curvature of the first connection line $L_1$'' at each lattice point is coincident with the curvature of the shell plating P at corresponding shell plating lattice point (s206 in FIG. 2(b)).

Then, the flat plate P''' is shrunk at a shrinkage ratio sh(s) along the second connection line $L_2$'' by the well-known method such as line heating so that the length of the second connection line $L_2$'' of the flat plate P''' coincides with the length of the second connection line $L_2$ of the shell plating P (s208 in FIG. 2(b)). Thereby, the shell plating P as shown in FIG. 1 is manufactured.

According to a knowledge of the inventor of this application, the area of the flat plate P''' as shown in FIG. 10 that is obtained by the shell plating developing method of the invention is 1.023 times the area of the shell plating P as shown in FIG. 1. On the other hand, according to the geodesic line developing method in which the geodesic line is the line connecting two points (R cos $\phi$, R sin $\phi$, −r) and (R cos $\phi$, −R sin $\phi$, −r) on the shell plating P as shown in FIG. 1, the shell plating P is likewise developed on the flat plate of substantial sector shape (not shown), with its area being equal to 1.076 times the area of the shell plating P. This means that according to the shell plating developing method of the invention, the shell plating P is manufactured by shrinking the flat plate P''' by approximately 2.2% of the total area, whereas according to the conventional shell plating developing method, it is required to shrink the flat plate by approximately 7.1% of the total area in manufacturing the shell plating P. That is, according to the shell plating developing method of the invention, it is possible to suppress the shrinkage ratio of the flat plate P''' necessary to manufacture the shell plating P to approximately ⅓ of the conventional geodesic line developing method.

Accordingly, according to the invention, it is possible to lead to reduction of the amount of machining the flat plate required for producing the shell plating as compared with the geodesic line developing method, and improvement of the efficiency in manufacturing the shell plating.

Also, according to the invention, where and in which direction the flat plate P''' as shown in FIG. 10 is bent or shrunk are grasped through the first connection line $L_1''$ and the second connection line $L_2''$ constituting the flat plate lattice system. Also, to what extent the flat plate P''' is bent along the second connection line $L_2''$ is grasped through the curvature (see s202 in FIG. 2(b)). Moreover, to what extent the intermediate curved plate formed by bending the flat plate P''' is shrunk in the direction of the second connection line $L_2''$ is grasped through the shrinkage ratio sh(s) (s204 in FIG. 2(b), see the curve (c) of FIG. 8). Thereby, it is expected that the high quality shell plating is manufactured more effectively without needing the skills.

While the applicational object of the shell plating developing method and the shell plating manufacturing method according to the invention is the shell plating P constituting a fraction of the tours as shown in FIG. 1 in this embodiment, it may be the shell plating of any other shape in another embodiment.

Figure 11:
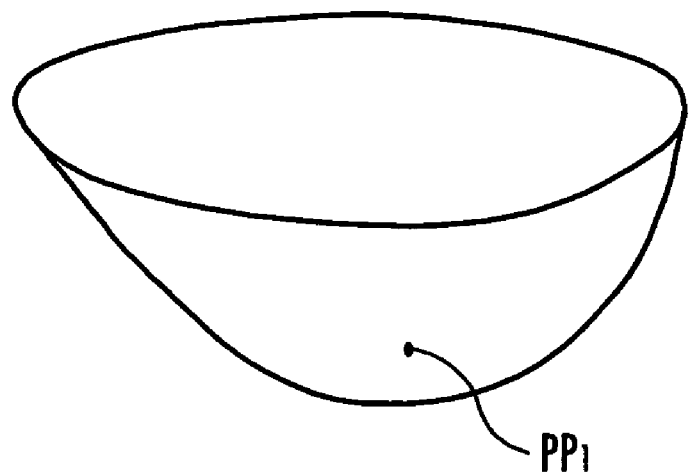
FIG. 11(a) is an explanatory view of an umbilicus and FIG. 11(b) is an explanatory view of a saddle point.
Figure 11:
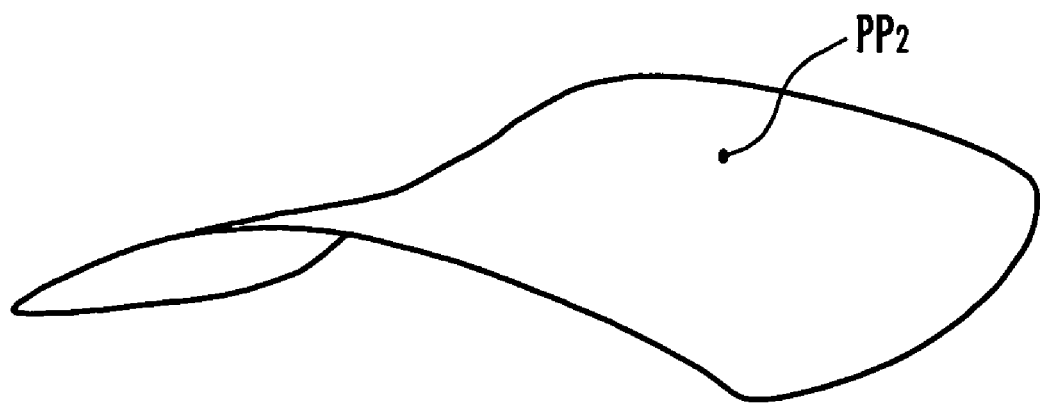
Figure 12:
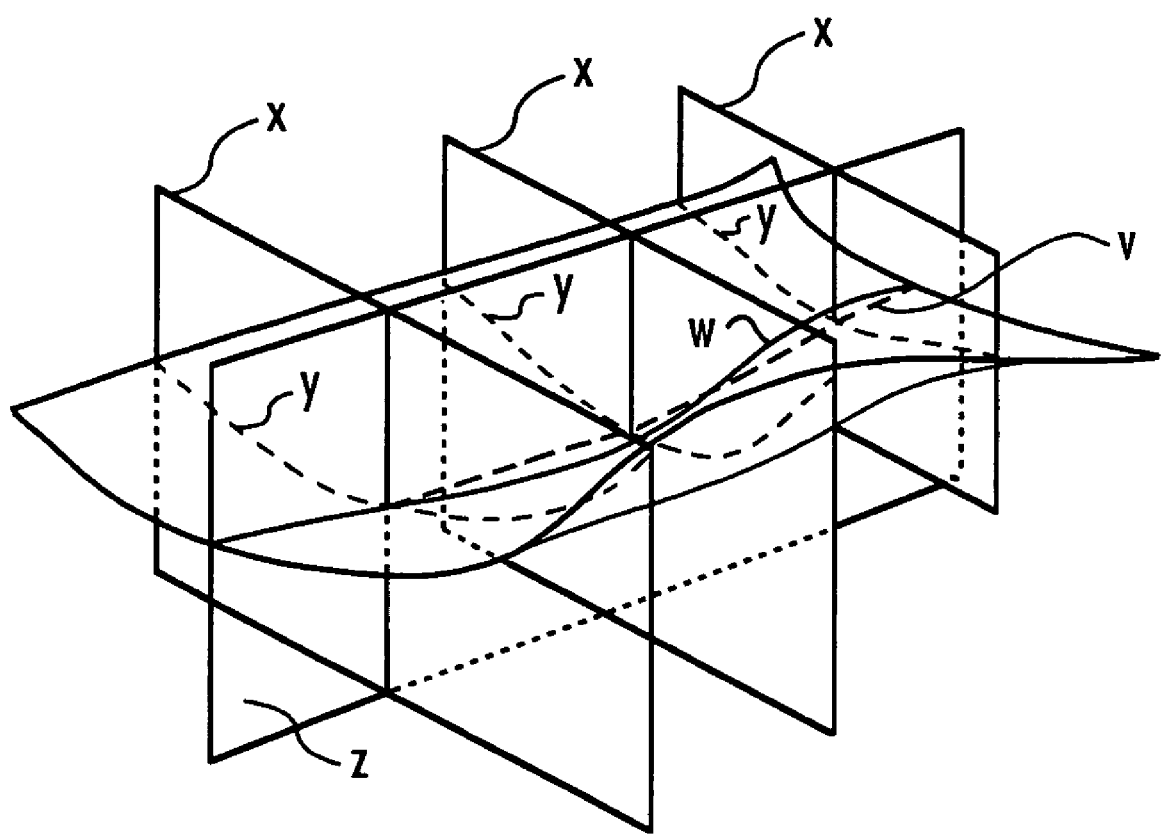
FIG. 12 is an explanatory view of the concept for a geodesic line developing method.

In the case where the shell plating contains a local singular point at which the first connection line $L_1$ and the second connection line $L_2$ are not determined, such as an umbilicus (see $pp_1$ in FIG. 11(a)) having a plurality of directions indicating the maximum curvature or minimum curvature, or a saddle point (see $pp_2$ in FIG. 11(b)) with an inverse sign of the maximum curvature or minimum curvature and the same absolute value, the first connection line $L_1$ or the second connection line $L_2$ extending from another lattice point of the shell plating lattice system and passing through the local umbilicus or saddle point may be determined as the first connection line $L_1$ or the second connection line $L_2$ regarding the umbilicus or saddle point.

While in this embodiment, the band-shaped area p is developed as a part p' of the circular cone surface P', it may be developed as a part of any other developable surface such as a cylinder or barrel in another embodiment.

While in this embodiment, the shell plating P is formed by shrinking the intermediate curved plate formed by bending the flat plate P''' in the direction of the second connection line $L_2''$, it may be formed by extending the intermediate curved plate in the direction of the second connection line $L_2''$ in another embodiment.

In another embodiment, when the band-shaped area p is developed as a fraction p' of the circular cone surface P' (see s110 in FIG. 2(a)), the second connection line $L_2$ is appropriately "shrunk" so that a fraction of the second connection line $L_2$ is coincident with the minimum central angle of curvature $\psi_{min}$ on the basis of the second connection line $L_2$ in which the central angle of curvature $\psi$ is "minimum" when the second connection line is developed as a fraction of the contour line $L_2'$ on the circular cone surface P', whereby the second connection line is developed as a fraction of the contour line $L_2'$ on the circular cone surface (see s110 in FIG. 2(a)).

Also, the shrinkage ratio sh(s) ($=\psi(s)/\psi_{min}-1$) of each second connection line $L_2$ in the band-shaped area when the second connection line $L_2$ is developed as a fraction of the contour line $L_2'$ on the circular cone surface P' and the integrated value (accumulated value) $Is(=\int ds \cdot sh(s))$ of the amount of machining corresponding to the shrinkage ratio sh(s) of the first connection line $L_1$ over the entire length are determined (see s112 in FIG. 2(a)).

Further, the circular cone surface P' is formally determined, and the band-shaped area p is developed as a part of the circular cone surface P', and then developed on the sector area p'' (see s114 to s120 in FIG. 2(a)). When the shell plating P of FIG. 1 is manufactured from this flat plate P''', the flat plate P''' is firstly bent along the second connection line $L_2''$ to form the intermediate curved plate (see s206 in FIG. 2(b)). Further, the intermediate curved plate is extended at the extension ratio ex(s) ($=1-(1+sh(s))^{-1}$) in the direction of the second connection line $L_2''$ (see s208 in FIG. 2(b)).

According to the another embodiment, it is possible to improve the efficiency in manufacturing the shell plating P by minimizing the extension amount of the flat plate P'''.

Also, a procedure for teaching at least one of the shell plating developing method and the shell plating manufacturing method according to the embodiment may be implemented using a computer program (hereinafter referred to as a "program"). In this case, the program adds the following functions to one computer (not shown) in which the program is installed or downloaded.

In addition to inputting the expression (1), the image data of the shell plating P is input from the camera or the like, whereby the computer is added with a function for recognizing the shape of the shell plating P.

Also, the computer is added with a function for providing the information as to the shell plating developing method (s102 to s120 in FIG. 2A) dealing with the shell plating P having the shape recognized on image display means (not shown) such as a liquid crystal panel or sounding means (not shown) such as a speaker to be recognized through the visual or auditory sense of human being. Also, the computer may have a function for providing the information as to the shell plating developing method in the form of the image or sound recognizable through the visual or auditory sense of human being by uploading the data regarding the shell plating developing method to another computer.

Moreover, the computer is added with a function for providing the information as to the flat plate P''' containing the first connection line $L_1''$ and the second connection line $L_2''$ (see FIG. 10), and the extension ratio ex(s) or the shrinkage ratio sh(s) in machining or developing (see FIG. 8) in the form of the image or sound recognizable through the visual or auditory sense of human being. Also, the computer may have a function for providing the information as to the flat plate P''' containing the first connection line $L_1''$ and the second connection line $L_2''$ and the extension ratio ex(s) or the shrinkage ratio sh(s) in machining or developing in the form of the image or sound recognizable through the visual or auditory sense of human being by uploading the relevant data to another computer.

With this program, the user can easily grasp the procedures for the shell plating developing method and the shell plating manufacturing method through the visual sense or the visual and auditory sense from one computer into which the program is directly installed or download, or another computer to which data is uploaded from the one computer.

Figure 2:
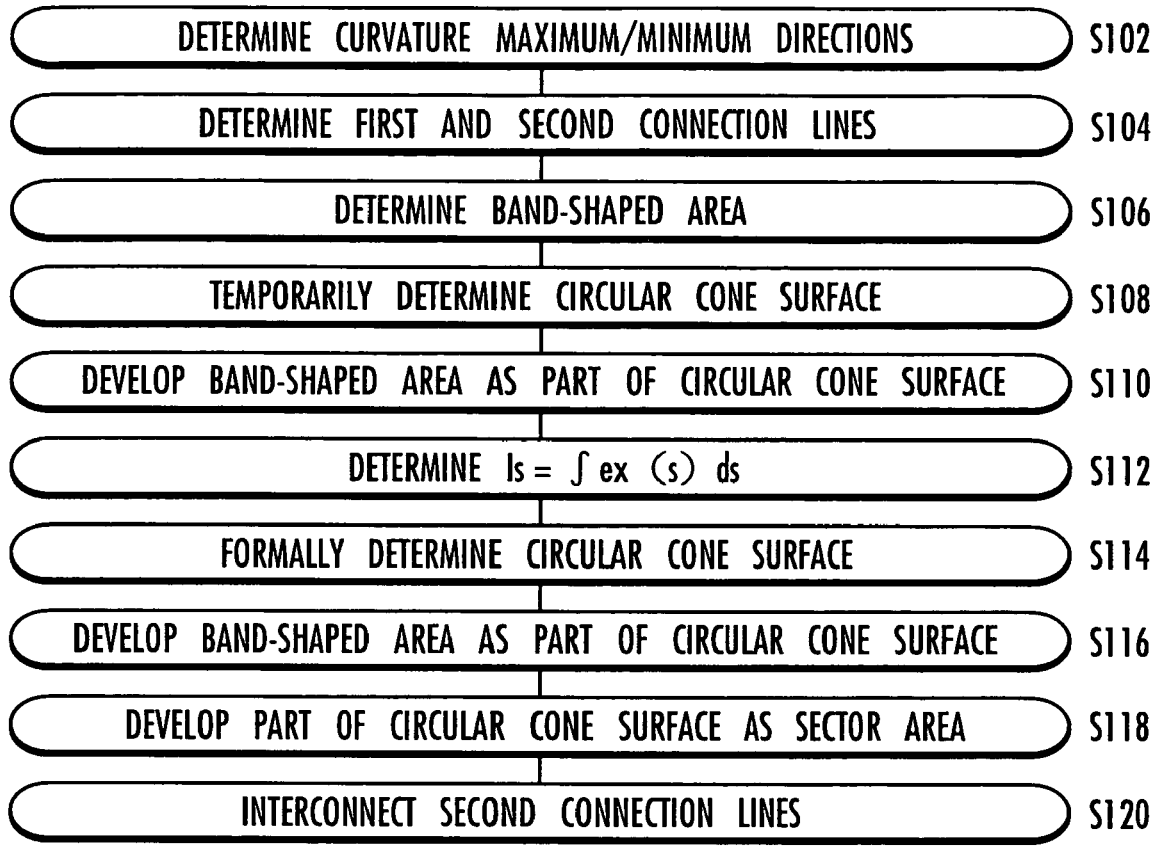
FIG. 2(a) is a flowchart showing the shell plating developing method according to the invention.
FIG. 2(b) is a flowchart showing the shell plating manufacturing method according to the invention.
Figure 2:
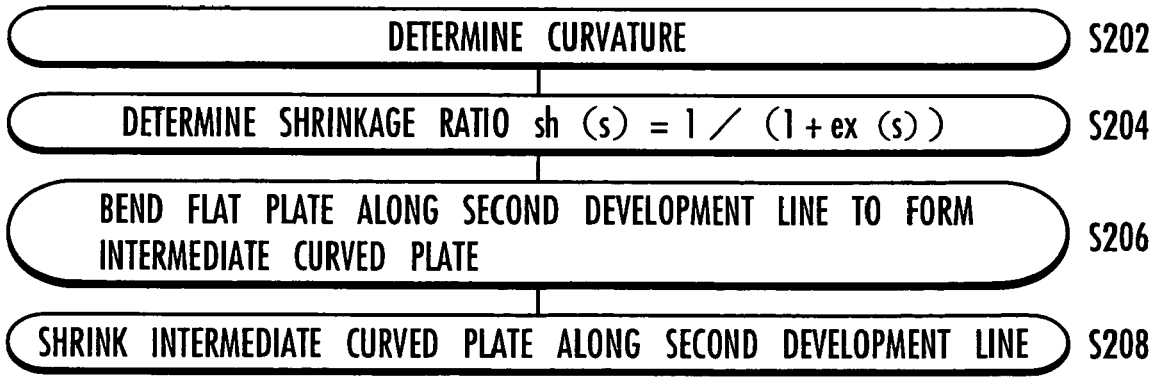
Figure 3:
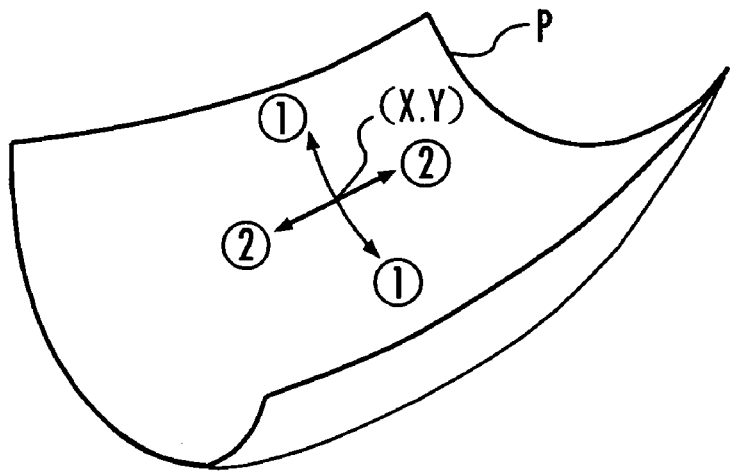
FIGS. 3 to 9 are explanatory views showing the procedures of the shell plating developing method according to the invention.

Also, the procedure for at least one of the shell plating developing method (FIG. 2(a)) and the shell plating manufacturing method (FIG. 2(b)) in this embodiment may be available using the image/sound recording medium such as a video tape or a DVD. In this case, the procedures for the shell plating developing method and the shell plating manufacturing method is taught using the images as shown in FIGS. 1 to 10 recorded on the recording medium by a reproducing apparatus such as a video deck or a DVD player, and the voices related to the images.

With the recording medium, the user easily grasps the procedures for the shell plating developing method and the shell plating manufacturing method through the visual or auditory sense.

The invention claimed is:

1. A shell plating developing method for developing a shell plating of a predetermined shape on a flat plate, comprising the steps of:
   determining a first connection line and a second connection line constituting a shell plating lattice system based on a curvature of said shell plating and being orthogonal at each lattice point of said shell plating lattice system; and
   developing said first connection line as a straight line on the flat plate while maintaining the length of the first connection line, and developing said second connection line on a flat plate as a line constituting a flat plate lattice system along with said straight line and being orthogonal to said straight line at each lattice point of the flat plate lattice system in such a way that the integrated value of the amount of machining corresponding to the expansion ratio or the shrinkage ratio of the second connection line is minimum.

2. The shell plating developing method according to claim 1, wherein out of the directions in which the curvature of said shell plating at each lattice point of said shell plating lattice system is maximum and minimum, the line extending in a direction where the absolute value of the curvature is large is determined as the first connection line and the line extending in a direction where the absolute value of the curvature is small is determined as the second connection line.

3. The shell plating developing method according to claim 1, wherein the connection lines extending in the directions in which the curvature of the shell plating at each lattice point of said shell plating lattice system is maximum and minimum are determined, the line on the shell plating interconnecting the end points of said connection lines in the shortest distance is determined as a geodesic line, and out of said connection lines, the line in which there is a smaller dislocation from said geodesic line is determined as the first connection line, and the line in which there is a larger dislocation from said geodesic line is determined as the second connection line.

4. The shell plating developing method according to claim 1, wherein when said first and second connection lines are developed from the shell plating to the flat plate, a shell plating fraction area of the shell plating containing said first and second connection lines is determined, a developable surface is determined in which the first connection line contained in said shell plating fraction area is developed as a straight line while the length of the first connection line is kept invariable, and the second connection line contained in said shell plating fraction area is developed in such a way that the integrated value of the amount of machining corresponding to the expansion ratio or the shrinkage ratio is minimum, and said shell plating fraction area is developed on a part of said developable surface, said part of said developable surface is developed on a flat plate fraction area, and the first or second connection lines corresponding to said adjacent flat plate fraction areas are connected.

5. The shell plating developing method according to claim 4, wherein a band-shaped area containing the first connection line and the second connection line between the adjacent first connection lines is determined as said shell plating fraction area, wherein out of the circular cone surfaces having a vertex on the extension line of a tangential vector to the first connection line at a shell plating lattice point contained in said shell plating development area, and having a rotation axis perpendicular to a curvature vector of the second connection line at the shell plating lattice point, and passing through an end point of a vector in which said curvature vector is divided by the square of the absolute value of the curvature, a circular cone surface in which the first connection line is developed as a fraction of the generating line while the length of the first connection line is maintained and the second connection line is developed as a fraction of the contour line in such a way that that the integrated value of the amount of machining corresponding to the extension ratio or the shrinkage ratio of the second connection line is minimum is determined as said developable surface, and wherein said shell plating fraction area is developed on a part of said developable surface, the part of said developable surface is developed on said flat plate fraction area of sector shape by a conical projection method, the first connection line developed on said developable surface is developed as a longitude line on the flat plate, the second connection line developed on said optimal circular cone surface is developed as a of latitude line on the flat plate, and the second connection lines corresponding to said adjacent flat plate fraction areas are interconnected.

6. The shell plating developing method according to claim 5, wherein on the basis of a second connection line in which the central angle of curvature is maximum or minimum when the second connection line is developed as a fraction of the contour line on said circular cone surface out of the second connection lines contained in said shell plating development area, a circular cone surface is determined as said developable surface in such a way that the integrated value of the amount of machining corresponding to the extension ratio or the shrinkage ratio of the second connection line is minimum when another second connection line is extended or shrunk to coincide with the central angle of curvature.

7. The shell plating developing method according to claim 4, wherein the second connection lines are interconnected in such a way that a dislocation between the second connection lines contained in said adjacent flat plate fraction areas is minimized by the least square method.

8. The shell plating developing method according to claim 1, wherein when a local saddle point or umbilicus where the first and second connection lines can not be determined exists on said shell plating, the first and second connection lines extending from another point of the shell plating and passing through the saddle point or umbilicus are determined as the first and second connection lines relevant to the saddle point or umbilicus.

9. A shell plating manufacturing method for manufacturing a shell plating of a predetermined shape from a flat plate, wherein after performing a shell plating developing method comprising the steps of:

constituting a shell plating lattice system, and out of the directions in which the curvature of a shell plating at each lattice point of the shell plating lattice system is maximum and minimum, determining a first connection line extending in a direction in which the absolute value of the curvature is large and determining a second connection line extending in a direction in which the absolute value of the curvature is small; and developing said first connection line as a straight line on a flat plate while maintaining the length of the first connection line, and developing the second connection line as a line constituting a flat plate lattice system along with said straight line and being perpendicular to said straight line at each lattice point of the flat plate lattice system on a flat plate in such a way that the integrated value of the amount of machining corresponding to the extension ratio or the shrinkage ratio of the second connection line is minimum;

said shell plating manufacturing method comprises the steps of:

bending said flat plate along the second connection line so that the curvature of the first connection line is coincident with the curvature based on in determining the first connection line on the shell plating, thereby forming an intermediate curved plate; and shrinking or extending said intermediate curved plate in the direction of the second connection line so that the length of the second connection line for said intermediate curved plate is coincident with the length of the second connection line for the shell plating in accordance with the extension ratio or the shrinkage ratio of the second connection line based on in developing the from the shell plating to the flat plate.

10. A computer program for teaching a shell plating developing method installed in one computer or uploaded via a network, wherein said computer program enables said one computer to perform an information providing function for the shell plating developing method or a function of uploading data regarding said shell plating developing method via a network to another computer to enable said another computer to perform said information providing function, said shell plating developing method comprising the procedures in which:

a shell plating lattice system is constituted, and out of the directions in which the curvature of a shell plating at each lattice point of the shell plating lattice system is maximum and minimum, a first connection line extending in a direction in which the absolute value of the curvature is large and a second connection line extending in a direction in which the absolute value of the curvature is small are determined; and said first connection line is developed as a straight line on a flat plate while the length of the first connection line is maintained, and the second connection line is developed as a line constituting a flat plate lattice system along with said straight line and perpendicular to said straight line at each lattice point of the flat plate lattice system on a flat plate in such a way that the integrated value of the amount of machining corresponding to the extension ratio or the shrinkage ratio of the second connection line is minimum.

11. A computer program for teaching a shell plating manufacturing method installed in one computer or uploaded via a network, wherein said computer program enables said one computer to perform an information providing function for a shell plating developing method, which provides the information as to the flat plate containing the first and second connection lines obtained by performing the shell plating developing method, the curvature based on in determining the first connection line on the shell plating, the extension ratio based on in developing the second connection line from the shell plating to the flat plate or the shrinkage ratio in manufacturing the shell plating based on said extension ratio, or the shrinkage ratio or the extension ratio in manufacturing the shell plating based on said shrinkage ratio, or a function of uploading data regarding said shell plating developing method via a network to another computer to enable said another computer to perform said information providing function, which provides the information as to the flat plate containing the first and second connection lines obtained by performing the shell plating developing method, the curvature based on in determining the first connection line on the shell plating, the extension ratio based on in developing the second connection line from the shell plating to the flat plate or the shrinkage ratio in manufacturing the shell plating based on said extension ratio, or the shrinkage ratio or the extension ratio in manufacturing the shell plating based on said shrinkage ratio;

wherein said shell plating developing method comprising the procedures in which:

a shell plating lattice system is constituted, and out of the directions in which the curvature of a shell plating at each lattice point of the shell plating lattice system is maximum and minimum, a first connection line extending in a direction in which the absolute value of the curvature is large and a second connection line extending in a direction in which the absolute value of the curvature is small are determined; and said first connection line is developed as a straight line on a flat plate while the length of the first connection line is maintained, and the second connection line is developed as a line constituting a flat plate lattice system along with said straight line and perpendicular to said straight line at each lattice point of the flat plate lattice system on a flat plate in such a way that the integrated value of the amount of machining corresponding to the extension ratio or the shrinkage ratio of the second connection line is minimum.

12. The computer program according to claim 11, wherein said computer program enables said one computer to perform an information providing function for the shell plating manufacturing method or a function of uploading the data relevant to said shell plating manufacturing method via a network to another computer to enable said another computer to perform the information providing function for the shell plating manufacturing method, said shell plating manufacturing method comprising the procedures in which the flat plate is bent along the second connection line so that the curvature of the first connection line may be coincident with the curvature based on in determining the first connection line on the shell plating to form an intermediate curved plate, and said intermediate curved plate is shrunk or extended in the direction of the second connection line so that the length of the second connection line on the intermediate curved plate may be coincident with the length of the second connection line on the shell plating in accordance with the extension ratio or the shrinkage ratio based on in developing the second connection line from the shell plating to the flat plate.

13. An image/sound recording medium for recording the image or the image and sound reproducible using an image/sound reproducing apparatus, said image or said image and sound being related with a shell plating developing method comprising the procedures in which:

a shell plating lattice system is constituted, and out of the directions in which the curvature of a shell plating at each lattice point of the shell plating lattice system is maximum and minimum, a first connection line extending in a direction in which the absolute value of the curvature is large and a second connection line extending in a direction in which the absolute value of the curvature is small are determined; and said first connection line is developed as a straight line on a flat plate while the length of the first connection line is maintained, and the second connection line is developed as a line constituting a flat plate lattice system along with said straight line and perpendicular to said straight line at each lattice point of the flat plate lattice system on a flat plate in such a way that the integrated value of the amount of machining corresponding to the extension ratio or the shrinkage ratio of the second connection line is minimum.

14. The image/sound recording medium according to claim 13, further comprising recording the image or the image and sound regarding the flat plate containing the first and second connection lines obtained by performing the shell plating developing method, the curvature based on in determining the first connection line on the shell plating, the extension ration based on in developing the second connection line from the shell plating to the flat plate or the shrinkage ratio in manufacturing the shell plating based on said extension ratio, or the shrinkage ratio or the extension ratio in manufacturing the shell plating based on said shrinkage ratio.

15. The image/sound recording medium according to claim 13, further comprising recording the image or the image and sound regarding said shell plating manufacturing method comprising the procedures in which the flat plate is bent along the second connection line so that the curvature of the first connection line may be coincident with the curvature based on in determining the first connection line on the shell plating to form an intermediate curved plate, and said intermediate curved plate is shrunk or extended along the direction of the second connection line so that the length of the second connection line on the intermediate curved plate may be coincident with the length of the second connection line on the shell plating in accordance with the extension ratio or the shrinkage ratio based on in developing the second connection line from the shell plating to the flat plate as a line constituting a flat plate lattice system along with said straight line and being perpendicular to said straight line at each lattice point of the flat plate lattice system on a flat plate in such a way that the integrated value of the amount of machining corresponding to the extension ratio or the shrinkage ratio of the second connection line is minimum;

said shell plating manufacturing method comprises the steps of:

bending said flat plate along the second connection line so that the curvature of the first connection line is coincident with the curvature based on in determining the first connection line on the shell plating, thereby forming an intermediate curved plate; and shrinking or extending said intermediate curved plate in the direction of the second connection line so that the length of the second connection line for said intermediate curved plate is coincident with the length of the second connection line for the shell plating in accordance with the extension ratio or the shrinkage ratio of the second connection line based on in developing the from the shell plating to the flat plate.

* * * * *